Dec. 22, 1931.    D. S. BAKER    1,837,605
APPARATUS FOR HANDLING MATERIALS
Filed June 29, 1926    2 Sheets-Sheet 1
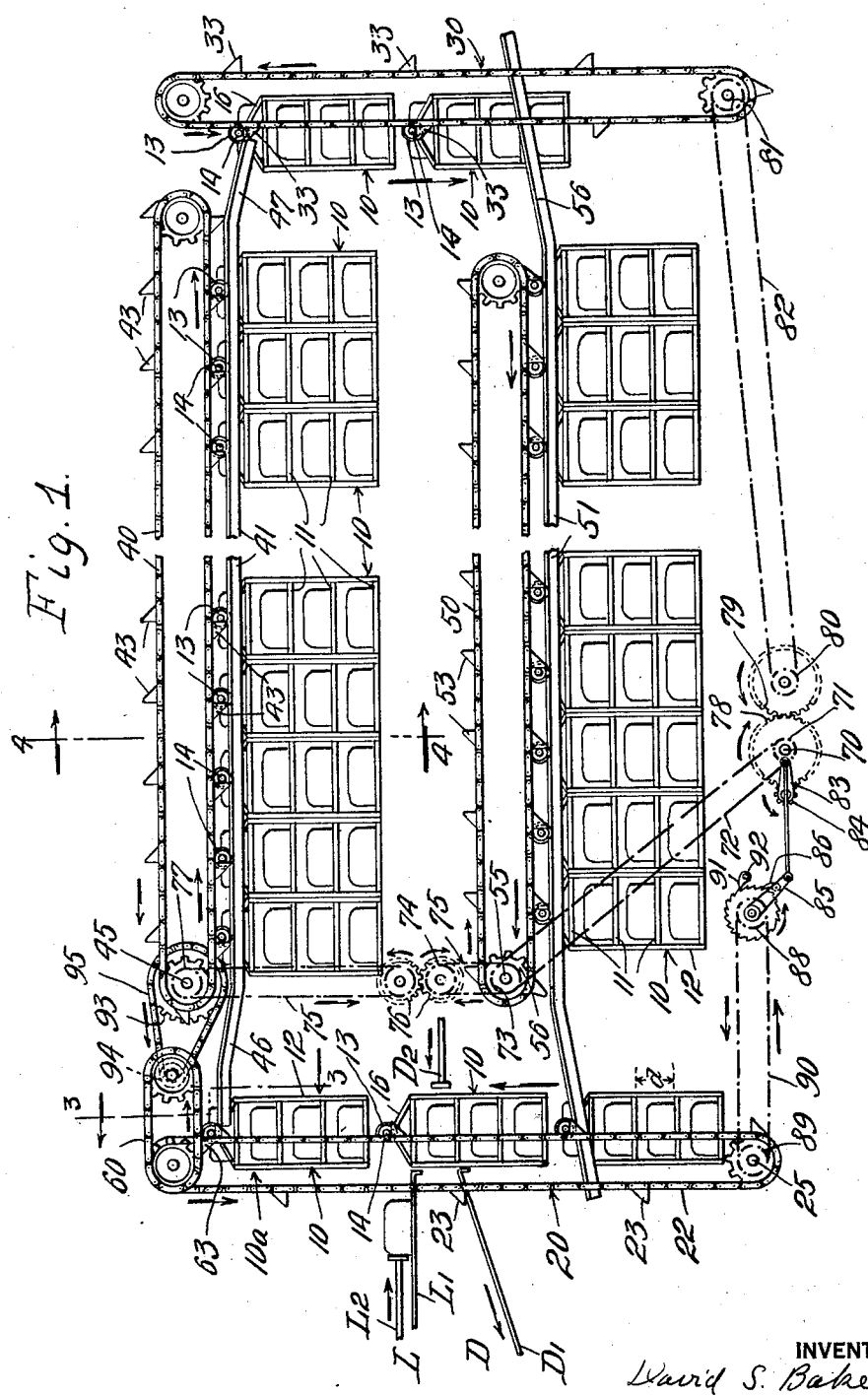
INVENTOR
David S. Baker
BY
Robert W Byerly
ATTORNEY Dec. 22, 1931.    D. S. BAKER    1,837,605
APPARATUS FOR HANDLING MATERIALS
Filed June 29, 1926    2 Sheets-Sheet 2
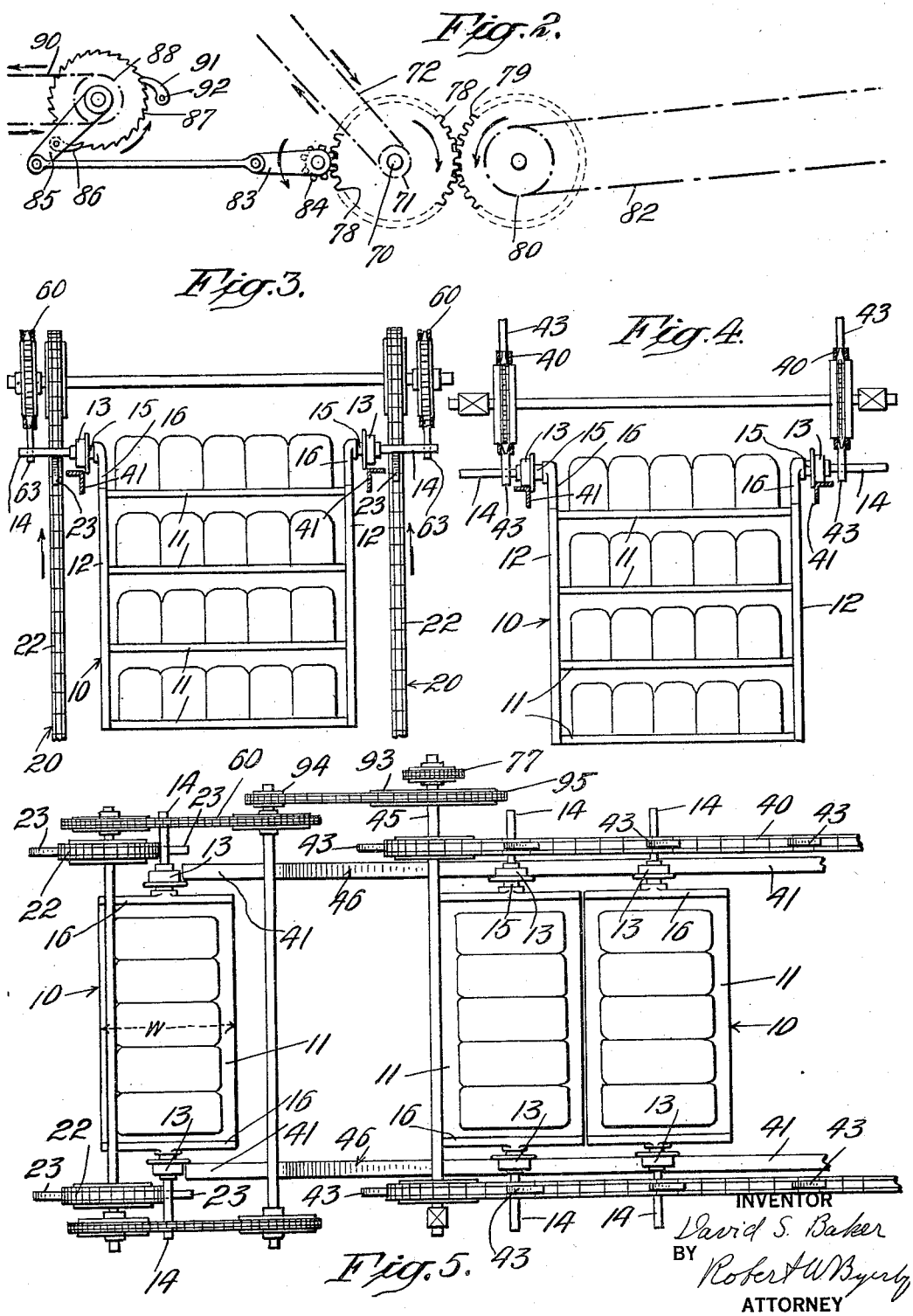

Patented Dec. 22, 1931

1,837,605

UNITED STATES PATENT OFFICE

DAVID S. BAKER, OF GREENWICH, CONNECTICUT

APPARATUS FOR HANDLING MATERIALS

Application filed June 29, 1926. Serial No. 119,302.

This invention relates to apparatus for handling materials and aims to facilitate the movement of materials and more particularly to provide for their treatment.

In my co-pending application filed June 27, 1923, Serial No. 647,964, I described apparatus in which a large number of carrying elements are moved in single file past a loading station, in order that they may be loaded conveniently, and then closely spaced in multiple file through a treatment space, so that the material on the carrying elements is conveniently arranged for treatment. In the specific apparatus shown in that application, the individual carrying elements are mounted in sets on collapsible carriers permitting a change in the relative position of the carrying elements of each carrier, which is utilized to cause a change in the movement of the carrying elements from single file to multiple file while the carriers are moved continuously in one direction. The apparatus to which the present application relates embodies the basic invention described and claimed in my previous application, but differs from the apparatus therein shown in that the change from single file movement to multiple file movement is effected by changing the direction of movement of the carriers. The present invention thus makes it possible to obtain the advantages of single file and multiple file movement without any change in the relative position of the carrying elements of each carrier. By thus permitting the use of rigid carriers, the invention simplifies, and decreases the cost of, the apparatus, and renders it particularly desirable for use in connection with certain classes of material, such, for example, as loaves of bread.

Other features and advantages of the invention are hereinafter pointed out, in connection with a detailed description of an illustrative embodiment of the invention, which is shown in the accompanying drawings, in which:—

Fig. 1 is a side elevation, partially diagrammatic, showing a complete bread-cooling apparatus;

Fig. 2 is a fragmentary side elevation showing, on a larger scale, the driving mechanism shown at the bottom of Fig. 1;

Figs. 3 and 4 are enlarged transverse sections taken on the lines 3—3 and 4—4 of Fig. 1 respectively; and Fig. 5 is an enlarged fragmentary plan view showing the part of the apparatus which appears in the upper left-hand corner of Fig. 1.

The apparatus illustrated includes a large number of carriers 10 each provided with a plurality of carrying elements or shelves 11, and means for moving these carriers in a closed circuit, which takes each carrying element past a loading station L, through a treatment space T, to a dumping station D, and back to the loading station L.

Each carrier includes a rigid frame which may consist simply of connecting members or corner posts 12 to which the carrying elements or shelves 11 are rigidly secured. Near the top of its frame, each carrier is provided with two outwardly projecting flanged wheels 13 and with fingers 14 for engaging guiding means and moving means respectively. The wheels may conveniently be supported on a stub axle 15 fixed in crosspieces 16 carried by its corner posts 12. The fingers 14 may be formed by the ends of the axle 15 as shown. The movement of the carrying elements 11 first in single file in a common path, and then in multiple file in parallel paths, is obtained by a change in the direction of the movement of each carrier with respect to the position of its carrying elements. Thus when the carrying elements are mounted one directly above another, as illustrated, and are all perpendicular to the connecting members 12, a movement of the carrying elements in single file in a common path is obtained by moving the carrier in a direction parallel to its connecting members 12; while a movement of the carrying elements in multiple file in parallel paths may be obtained by moving the carriers in any other direction, for example, in a direction perpendicular to their connecting members 12. In the apparatus illustrated, mechanism is provided for automatic movement of the carriers in these two directions in a closed circuit.

The means for moving the carriers in the apparatus illustrated include two vertical conveyers 20, 30, and two horizontal conveyers 40, 50. Tracks 41, 51 are provided under the lower reaches of the horizontal conveyers. The chains 22 of the conveyer 20, which moves the carriers past the dumping station D and the loading station L, are provided with flights 23, which are spaced by a distance equal to the distance $d$ between two carrying elements of a carrier multiplied by the number of carrying elements of each carrier, which, in the form illustrated, is four. This distance, $4\,d$, may be regarded as the length of a carrier, and is hereinafter so designated. The flights 33 of the vertical conveyer 30 are similarly spaced. The flights 43, 53 of the conveyers 40, 50 are spaced by a distance $w$ equal to the length of a carrying element 11, or the width of a carrier. The ratio of the rates of movement of the vertical conveyers 20, 30, and the horizontal conveyers 40, 50, is proportional to the spaces between the flights of the conveyers, that is to say, the vertical conveyers move through a distance equal to the length of a carrier in the same time that the horizontal conveyers move through a distance equal to the width of a carrier.

In addition to the four conveyers mentioned, there is a short high speed conveyer for moving the carriers from the upper end of the vertical conveyer 20 to the horizontal conveyer 40.

While the invention is not limited to any particular means for driving the conveyers, it is desirable that they be interconnected so as to give them the relative rates of movement hereintofore specified. All the conveyers may conveniently be driven from a common driving shaft 70.

The horizontal conveyers 40, 50 are connected with the shaft 70 by the following parts: A sprocket 71 fixed on this shaft is connected by a driving chain 72 to a sprocket 73 fixed on a shaft 55 which carries the sprockets 56 over which the chains of the conveyer 50 pass. The shaft 55 is connected with a shaft 45 of the conveyer 40 through a sprocket 74, chains 75, sprockets and gears 76 to reverse the direction of motion, and a sprocket 77 fixed on the shaft 45.

The vertical conveyer 30 is connected with the shaft 70 through gears 78, 79, sprockets 80, 81 and a chain 82. The sprocket 80 is larger than the sprocket 71, to give the conveyer 30 the more rapid movement above specified.

The vertical conveyer 20 may be connected with the shaft 70 in the same manner as the conveyer 30. However, a part of the invention consists in giving the conveyer 20 an intermittent movement bringing each carrying element to rest at the dumping station D and the loading station L, to facilitate loading and emptying the elements. In the form shown, such an intermittent movement is secured by connecting a crank 83, driven by a gear 84 meshing with the gear 78 on the shaft 70, to an oscillated arm 85, which carries a pawl 86, engaging a ratchet 87, which is connected to the sprocket shaft 25 of the conveyer 20, through sprocket 88, 89 and a chain 90. A pawl 91 mounted on a fixed pivot 92 engages the ratchet 87 to prevent backward movement of the ratchet and the conveyer 20. The proportion of the parts is such that during each oscillation of the arm 85 in one direction, the conveyer 20 is moved through the distance $d$ which separates successive shelves of each carrier. During the other half of each oscillation of the arm, the conveyer 20 remains stationary. The average rate of movement of the conveyer 20 is however the same as that of the conveyer 30.

The conveyer 60 may be driven from the shaft 45 by means of sprockets 93, 94 and a chain 95. This conveyer is driven so rapidly that its single pair of flights 63 move the length of its lower reach once during each period of rest of the conveyer 20.

The operation of the device, which has been described, is as follows:—The fingers 14 of the carriers are engaged by the flights 23 of the conveyer 20 which carry the carriers upward with a rapid but intermittent movement. When the carriers are in engagement with these flights, the distance between the upper shelf of each carrier and the lower shelf of the preceding carrier is the same as that between the individual shelves of each carrier. The intermittent upward motion brings each shelf of each carrier to rest at a level with a platform L¹ at the loading station L. While in this position, each shelf is loaded with material, such as loaves of bread, pushed onto it from the platform L¹. Since the shelves reach and stop at this platform at regular intervals, the loading may be effected by a mechanically driven pusher L².

When each carrier arrives at nearly the upper end of the conveyer 20, in the position of the conveyer 10a in Fig. 1, its fingers 14 are engaged by the flights 63 of the conveyer 60 which move it out of engagement with a flight 23 on the conveyer 20, and along the track 41 out of line with the carriers below it, before the conveyer 20 makes its next upward movement. The wheels of the carrier then slide down to an inclined portion 46 of the track 41 into position to be engaged by the flights 43 of the conveyer 40. With their wheels running on the track 41, the carriers are moved slowly by the conveyer 40 with their shelves closely spaced in edge-to-edge relation. During such movement, the shelves of the carriers form continuous superimposed traveling supports on which the bread is exposed to the air for cooling.

As each carrier reaches the end of the conveyer 40, its wheels run down an inclined portion 47 at the end of the track 41 bringing its fingers into engagement with the flights 33 of the conveyer 30. The carriers are then lowered by the conveyer 30, until their wheels 13 strike an inclined portion 56 of the track 51, down which they slide to bring the fingers into position to be engaged by the flights 53 of the horizontal conveyer 50. The carriers while moved by the conveyer 50, are positioned in the same way as when moved by the conveyer 40. This provides for additional cooling of the bread on the return movement. When each carrier reaches the end of the conveyer 50, its wheels roll down to an inclined portion 57 of the track 51, until its fingers are brought into engagement to one of the flights 23 of the conveyer 20. During the intermittent upward movement of each carrier, each of its shelves stops at the level with a chute $D^1$ at the dumping station D, so that the bread contained on this shelf may be removed. Since the shelves reach the dumping station at regular intervals, the removal of the bread may be effected by a mechanically driven pusher $D^2$.

It should be noted that no power is necessary to operate the apparatus other than that required to overcome the friction of its parts, because the energy given up by the carriers in descending is returned from the conveyer 30 to the shaft 70, so that it assists in driving the other conveyers.

What is claimed is:

1. Apparatus for handling materials, comprising the combination of a plurality of carrying elements rigidly connected together in sets, means for guiding said carrying elements in a closed circuit, in parts of which the carrying elements are guided in single file and in the remainder of which they are guided in multiple file, and interconnected means for moving the carrying elements at a relatively rapid rate in the first-mentioned parts of the circuit and at a relatively slow rate in the remainder of the circuit and maintaining a fixed ratio between the rates of said movements.

2. Apparatus for handling materials, comprising a plurality of carriers each comprising a plurality of carrying elements secured to a connecting member, means for guiding the carriers in a closed parallelogram path, two sides of which are parallel to the connecting members of the carriers, and interconnected means for moving the carriers at a relatively high speed in the parts of the circuit which are parallel to the connecting members of the carriers and at a relatively low speed in the remainder of the circuit and maintaining a fixed ratio between the rates of said movements.

3. Apparatus for handling materials, comprising a plurality of carriers each consisting of a number of carrying elements rigidly secured to a rigid connecting member, and means for so moving the carriers in a closed circuit that in a part of the circuit each carrier moves longitudinally of its connecting member at a relatively high speed and in another part moves at an angle to its connecting member at a relatively slow speed.

4. Apparatus for handling materials, comprising a plurality of carriers each having uniformly spaced superimposed carrying elements held in fixed relation to each other, means for moving each carrier at an angle to the horizontal with its carrying elements following one after another in a common path and with its front carrying element separated from the rear carrying element of the preceding carrier by the same distance as that which separates successive carrying elements of each carrier, and then moving it horizontally with its carrying elements in close proximity to those of the preceding carrier.

5. Apparatus for handling materials, comprising a plurality of carriers each having superimposed carrying elements held in fixed relation to one another, means for moving the carriers in a closed circuit having two horizontal portions, and two portions at an angle to the horizontal, the speed of the carriers in the different parts of the circuit being such that the carrying elements of successive carriers are closely spaced in a horizontal portion of the circuit, and are superimposed at uniform distances in a portion of the circuit inclined to the horizontal.

6. Apparatus for handling materials, comprising a plurality of carriers each having a number of carrying elements located directly one above the other and held in fixed relation to each other, means for moving said carriers in a closed circuit having two horizontal portions and two vertical portions, means for regulating the speed of the carriers so that the carrying elements of successive carriers are located edge-to-edge in the horizontal portions of the circuit, and are located one above another at uniform distances in a vertical portion of the circuit.

7. Apparatus for handling materials, comprising the combination with a treatment space and an intermittently operating loading device, of a plurality of carrying elements, and automatic means for moving said elements past the loading device in single file with a relatively rapid step-by-step movement, and then through the treatment space in multiple file with a relatively slow movement.

8. Apparatus for handling materials, comprising the combination with a treatment space and an intermittently operating loading device, of a plurality of carrying elements, automatic means for moving said carrying elements past the loading device uniformly spaced in single file at a direction at an angle to the horizontal with a relatively rapid step-by-step movement, and then horizontally through the treatment space in multiple file with a relatively slow movement.

9. Apparatus for handling materials, comprising the combination with a loading station, of a plurality of carriers each having a number of superimposed carrying elements held in fixed relation to one another, means for moving the carriers successively past the loading station at an angle to the horizontal with their carrying elements uniformly spaced in single file and with a step-by-step movement which brings each carrying element to rest at the loading station, and then horizontally with their carrying elements closely spaced in multiple file.

10. Apparatus for handling materials, comprising a plurality of carriers each having a number of superimposed carrying elements held in fixed relation to one another, means for moving the carriers in a closed circuit having two horizontal portions and two portions at an angle to the horizontal, one of which is adjacent to a loading station, with the carrying elements of successive carriers superimposed at uniform distances in this portion of the circuit and located edge-to-edge in the horizontal portions of the circuit, and means for stopping each carrier momentarily when each of its carrying elements is at the loading station.

11. Apparatus for handling materials, comprising a plurality of carriers each having a length greater than its width, means for moving the carriers successively first endwise and then sidewise, the ratio between the rate of endwise and the rate of the sidewise movement being substantially equal to the ratio between the length and the width of each carrier, so that the carriers are spaced closely end-to-end during the endwise movement and closely side-by-side during the sidewise movement.

12. Apparatus for handling materials, comprising a plurality of carriers each having a length greater than its width, means for moving said carriers successively in a closed circuit in a part of which they are moved endwise, and in another part of which they are moved sidewise, the rate of the endwise movement being greater than that of the sidewise movement, so that the carriers are spaced closely end-to-end during endwise movement and closely side-by-side during sidewise movement.

13. Apparatus for handling materials, comprising a plurality of carriers each of which has a length greater than its width, means for moving the carriers successively endwise at a relatively high speed, and then successively sidewise at a relatively slow speed, so that the carriers are spaced closely end-to-end during the endwise movement and closely side-by-side during the sidewise movement, and means for causing a rapid sidewise movement of each carrier after its endwise movement and before its slow sidewise movement in order to move it out of the way of the following carrier.

14. Apparatus for handling materials, comprising carriers each having a length greater than its width, means for moving said carriers successively first endwise with a relatively rapid intermittent movement and then sidewise with a relatively slow continuous movement, so that the carriers are spaced closely end-to-end during the endwise movement and closely side-by-side during the sidewise movement, and means for moving each carrier rapidly sidewise at the end of its endwise movement and before its slow sidewise movement during a period when the following carrier is at rest.

15. Apparatus for handling materials, comprising a plurality of carriers each consisting of an axle having wheels and a set of trays suspended from the axle, two horizontal tracks one above the other for the wheels of the carriers, means for slowly moving the carriers along said tracks in opposite directions, interconnected means at one end of the tracks for rapidly lowering each carrier from the upper track to the lower track, and interconnected means at the opposite end of the tracks for rapidly raising each carrier from the lower track to the upper track.

In testimony whereof I have hereunto set my hand.

DAVID S. BAKER.